US012716001B2

(12) United States Patent
Kim et al.

(10) Patent No.: US 12,716,001 B2
(45) **Date of Patent: *Aug. 25, 2026**

(54) AROMATIC ORGANIC SOLVENT COMPOSITION AND PAINT COMPOSITION COMPRISING THE SAME

(71) Applicants: SK Innovation Co., Ltd., Seoul (KR); SK Geo Centric Co., Ltd., Seoul (KR)

(72) Inventors: Hyeong Cheol Kim, Daejeon (KR); Joo Pyung Lee, Daejeon (KR); Jun Hee Kim, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 403 days.

This patent is subject to a terminal disclaimer.

(21) Appl. No.: 18/211,385

(22) Filed: Jun. 19, 2023

(65) Prior Publication Data

US 2023/0407113 A1 Dec. 21, 2023

(30) Foreign Application Priority Data

Jun. 20, 2022 (KR) ........................ 10-2022-0074547

(51) Int. Cl.
*C09D 7/20* (2018.01)

(52) U.S. Cl.
CPC ...................................... *C09D 7/20* (2018.01)

(58) Field of Classification Search
CPC .................................... C09D 7/20; C09D 7/40
See application file for complete search history.

(56) References Cited

U.S. PATENT DOCUMENTS

| | | | |
|---|---|---|---|
| 7,241,930 B2 | 7/2007 | Schlosberg et al. | |
| 2008/0185337 A1 * | 8/2008 | Almadidy ................. | C02F 3/34 210/611 |
| 2013/0122420 A1 | 5/2013 | Kato | |
| 2021/0230437 A1 | 7/2021 | Choi et al. | |

FOREIGN PATENT DOCUMENTS

| | | | | |
|---|---|---|---|---|
| AU | 2021102676 | A4 | | 7/2021 |
| CN | 107937014 | A | | 4/2018 |
| JP | 2004155730 | A | | 6/2004 |
| JP | 2006299173 | A | * | 11/2006 |
| KR | 102050921 | B1 | | 12/2019 |
| KR | 1020200018869 | A | | 2/2020 |
| KR | 1020200042630 | A | | 4/2020 |
| KR | 1020200127870 | A | | 11/2020 |
| KR | 102412228 | B1 | | 6/2022 |
| WO | 2014047000 | A1 | | 3/2014 |

* cited by examiner

*Primary Examiner* — Taiwo Oladapo
(74) *Attorney, Agent, or Firm* — The Webb Law Firm

(57) ABSTRACT

The present invention relates to an aromatic organic solvent composition and a paint composition including the same. In some embodiments, the present invention relates to an aromatic organic solvent composition in which a weight ratio of C9 aromatic hydrocarbon to C10 aromatic hydrocarbon is 1:1.5 to 1:2.8, a weight ratio of trimethylbenzene and tetramethylbenzene is 1:0.1 to 1:1, the content of naphthalene is 5 ppm or less, and a pour point is −90° C. to −30° C.

11 Claims, No Drawings

AROMATIC ORGANIC SOLVENT COMPOSITION AND PAINT COMPOSITION COMPRISING THE SAME

CROSS-REFERENCE TO RELATED APPLICATION

This application claims priority to Korean Patent Application No. 10-2022-0074547, filed Jun. 20, 2022, the disclosure of which is hereby incorporated by reference in its entirety.

BACKGROUND OF THE INVENTION

Field of the Invention

The following disclosure relates to an aromatic organic solvent composition and a paint composition comprising the same.

Description of Related Art

The lowest flow temperature at which an organic solvent composition has fluidity is referred to as a pour point. When the temperature of the organic solvent composition decreases and approaches the pour point, precipitates are formed and gelled, the solubility of the organic solvent is reduced, and transportation of the composition through lines or pumps is difficult.

Heavy aromatic organic solvents with C10 aromatic compounds as the main compound have excellent work stability due to excellent solubility and high flash point, and have been used in various industries due to their low pour point compared to the general organic solvent composition containing aliphatic compounds.

However, such a heavy aromatic organic solvent composition not only causes precipitate formation and gelation in extreme environments of −30° C. or more, causing problems in facilities such as clogging and corrosion of pipes, but also reduces fluidity to reduce the solubility of organic solvents.

SUMMARY OF THE INVENTION

An embodiment of the present invention is directed to providing a heavy aromatic organic solvent composition that maintains excellent physical properties of existing heavy aromatic organic solvents and, at the same time, significantly lowers the pour point, thereby not causing precipitate formation and gelation even in an extremely low-temperature environment.

In one general aspect, there is provided an aromatic organic solvent composition in which a weight ratio of C9 aromatic hydrocarbon to C10 aromatic hydrocarbon is 1:1.5 to 1:2.8, a weight ratio of trimethylbenzene and tetramethylbenzene is 1:0.1 to 1:1, the content of naphthalene is 5 ppm or less, and a pour point is −90° C. to −30° C.

The aromatic organic solvent composition according to an embodiment comprises 27 to 40% by weight of C9 aromatic hydrocarbons and 60 to 75% by weight of C10 aromatic hydrocarbons; and the weight ratio of the C9 aromatic hydrocarbon to the C10 aromatic hydrocarbon may be 1:1.5 to 1:2.8.

A weight ratio of dimethylethylbenzene to tetramethylbenzene in the aromatic organic solvent composition according to an embodiment may be 1:0.05 to 1:0.5.

The aromatic organic solvent composition according to an embodiment may comprise 1 ppm or less of methylnaphthalene in the total weight of the composition.

The aromatic organic solvent composition according to an embodiment may have a mixed aniline point of 10° C. to 30° C.

The aromatic organic solvent composition according to an embodiment may have a dry point of 180° C. to 200° C.

The aromatic organic solvent composition according to an embodiment may have an initial boiling point (IBP) of 170° C. to 185° C.

The aromatic organic solvent composition according to an embodiment may have a final boiling point (FBP) of 190° C. to 210° C.

The aromatic organic solvent composition according to an embodiment may have a specific gravity of 0.880 to 0.895.

In another general aspect, there is provided a paint composition comprising the aromatic organic solvent composition as described above, and any one or two or more mixed resins selected from ester-based, urethane-based, urea-based, epoxy-based, and/or acrylic-based resins.

The paint composition according to an embodiment may comprise 20 to 40% by weight of the aromatic organic solvent composition with respect to the total weight of the paint composition.

DESCRIPTION OF THE INVENTION

Hereinafter, the present invention will be described in more detail. Technical terms and scientific terms used herein have the general meanings understood by those skilled in the art to which the present invention pertains, unless otherwise defined, and a description for the known function and configuration unnecessarily obscuring the gist of the present invention will be omitted in the following description.

Unless the context clearly indicates otherwise, the singular forms of the terms used in the present specification may be interpreted as including the plural forms. As used herein, the singular form of "a", "an", and "the" include plural referents unless the context clearly states otherwise.

For the purposes of this specification, unless otherwise indicated, all numbers expressing quantities of ingredients, reaction conditions, dimensions, physical characteristics, and so forth used in the specification and claims are to be understood as being modified in all instances by the term "about." Hereinafter, unless otherwise defined herein, "about" may be considered as a value within 30%, 25%, 20%, 15%, 10%, 5%, 3%, 2%, 1%, 0.5%, 0.1%, or 0.01 of the specified value. Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the term "comprise" is an "open" description having the meaning equivalent to expressions such as "include," "contain," "have," or "feature", and does not exclude elements, materials, or processes that are not further listed.

An embodiment provides a heavy aromatic organic solvent composition that not only has excellent safety to the human body and the environment because the content of naphthalene is significantly reduced, but also maintains excellent physical properties of existing heavy aromatic organic solvents and/or does not cause precipitate formation and gelation even in an extremely low-temperature environment.

In some embodiments, the aromatic organic solvent composition according to an embodiment has a weight ratio of C9 aromatic hydrocarbon to C10 aromatic hydrocarbon (C9:C10) of 1:1.5 to 1:2.8, a weight ratio of trimethylbenzene to tetramethylbenzene of 1:0.1 to 1:1, and a significantly reduced naphthalene content of 5 ppm or less.

As the aromatic organic solvent composition according to an embodiment satisfies the above constitutional combinations, the aromatic organic solvent composition may maintain excellent physical properties of existing heavy aromatic organic solvent compositions, may have a pour point of −90° C. to −30° C., and may have a very excellent effect of preventing formation of precipitates in an extremely low-temperature environment.

In general, when the aromatic solvent composition which comprises 50% by weight or more of C10 aromatic hydrocarbon comprises naphthalene, solid precipitation may be accelerated by the interaction between C10 aromatic hydrocarbon and naphthalene.

However, the aromatic organic solvent composition according to an embodiment comprises less than 5 ppm of naphthalene, and satisfies both the weight ratio of trimethylbenzene to tetramethylbenzene and the weight ratio of C9 aromatic hydrocarbon to C10 aromatic hydrocarbon as described above, thereby effectively suppressing solid precipitation at a low temperature of −30° C. or less. In addition, it is possible to provide an aromatic organic solvent with very low toxicity because the content of naphthalene, which is classified as a specific water quality hazardous substance and a class 2B carcinogen, is significantly reduced.

In some examples, the C9 aromatic hydrocarbon and the C10 aromatic hydrocarbon may satisfy the weight ratio described above, and in some examples the aromatic organic solvent composition may comprise 27 to 50% by weight or 27 to 40% by weight of C9 aromatic hydrocarbons based on the total weight of the aromatic organic solvent composition, and/or may comprise 50 to 75% by weight or 60 to 75% by weight of C10 aromatic hydrocarbons based on the total weight of the aromatic organic solvent composition.

The C9 aromatic hydrocarbon is not particularly limited as long as it is an aromatic hydrocarbon material comprised of 9 carbons, or may comprise, for example, any one or a mixture of two or more selected from isopropylbenzene, n-propylbenzene, 1-methyl-4-ethylbenzene, 1-methyl-3-ethylbenzene, 1,3,5-trimethylbenzene, 1-methyl-2-ethylbenzene, 1,2,4-trimethylbenzene, 1,2,3-trimethylbenzene, indane, p-ethyltoluene, o-ethyltoluene, m-ethyltoluene, and/or the like.

The C10 aromatic hydrocarbon is not particularly limited as long as it is an aromatic hydrocarbon material composed of 10 carbons, or may comprise, for example, any one or a mixture of two or more selected from t-butylbenzene, isobutylbenzene, sec-butylbenzene, 1-methyl-3-isopropylbenzene, 1-methyl-4-isopropylbenzene, 1,3-diethylbenzene, 1-methyl-2-isopropylbenzene, 1-methyl-3-n-propylbenzene, 1-methyl-4-n-propylbenzene, 1,4-diethylbenzene, n-butylbenzene, 1,3-dimethyl-5-ethylbenzene, 1,2-diethylbenzene, 1-methyl-2-n-propylbenzene, 1,4-dimethyl-2-ethylbenzene, 1,3-dimethyl-4-ethylbenzene, 1,2-dimethyl-4-ethylbenzene, 1,3-dimethyl-2-ethylbenzene, 2-methylindane, 1-methylindane, 1,2-dimethyl-3-ethylbenzene, 1,2,4,5-tetramethylbenzene, 1,2,3,5-tetramethylbenzene, 5-methylindane, 1,2,3,4-tetramethylbenzene, 4-methylindane, tetralin, naphthalene, and/or the like.

In some embodiments, 1,2,3-trimethylbenzene and 1,2-dimethyl-4-ethylbenzene may each independently be comprised in an amount of 5 to 30% by weight, or 15 to 30% by weight. In some embodiments, 1,2,4-trimethylbenzene, 1,3-dimethyl-5-ethylbenzene, 1,4-dimethyl-2-ethylbenzene, 1,3-dimethyl-4-ethylbenzene, and/or 1,2,4,5-tetramethylbenzene may each independently be comprised in an amount of 1 to 10% by weight, or 5 to 10% by weight.

In some embodiments, the weight ratio of trimethylbenzene to tetramethylbenzene in the aromatic organic solvent composition may be 1:0.01 to 1:1, or 1:0.1 to 1:1, or 1:0.1 to 1:0.5. If any of the above weight ratios is satisfied, the aromatic organic solvent composition may have a lower pour point and/or more excellent evaporation rate than existing heavy aromatic organic solvents when combined with other components. In the organic solvent for paint, since the drying rate greatly affects the main properties of film formation, such as workability and smoothness, maintaining an appropriate drying rate is an important factor for maintaining excellent film properties.

In some embodiments, trimethylbenzene may comprise a mixture of isomers of trimethylbenzene, or for example, may comprise 1,3,5-trimethylbenzene, 1,2,3-trimethylbenzene, and/or 1,2,4-trimethylbenzene. In some embodiments, the trimethylbenzene satisfies the weight ratio described above, but may be comprised in an amount of 10 to 40% by weight, or 20 to 35% by weight based on the total weight of the aromatic organic solvent composition.

In some embodiments, tetramethylbenzene may comprise a mixture of tetramethylbenzene isomers, or for example, may comprise 1,2,4,5-tetramethylbenzene, 1,2,3,5-tetramethylbenzene, and/or 1,2,3,4-tetramethylbenzene. In some embodiments, the tetramethylbenzene satisfies the weight ratio described above, and/or may be comprised in an amount of 5 to 30% by weight, or 5 to 20% by weight, or 5 to 15% by weight based on the total weight of the organic solvent composition.

In some embodiments, the weight ratio of dimethylethylbenzene to tetramethylbenzene in the aromatic organic solvent composition may be 1:0.05 to 1:0.5, 1:0.01 to 1:0.5, or 1:0.1 to 1:0.5. If any of the above weight ratios is satisfied, the pour point of the aromatic organic solvent composition may be further reduced, and/or an effect of preventing formation of precipitates at extremely low temperatures may be further improved.

In some embodiments, dimethylethylbenzene may comprise an isomer mixture of dimethylethylbenzene, and for example, may comprise 1,3-dimethyl-5-ethylbenzene, 1,4-dimethyl-2-ethylbenzene, 1,3-dimethyl-4-ethylbenzene, 1,2-dimethyl-4-ethylbenzene, 1,3-dimethyl-2-ethylbenzene, and/or 1,2-dimethyl-3-ethylbenzene. In some embodiments, the dimethylethylbenzene may be comprised in an amount of 20 to 60% by weight, or 30 to 50% by weight based on the total weight of the aromatic organic solvent composition.

If either of the above contents is satisfied, the aromatic organic solvent composition may have more excellent solubility and/or compatibility than existing heavy aromatic organic solvents, and/or may have very excellent solubility for various engineering resins.

In some embodiments, the aromatic organic solvent composition may be essentially free of, or free of, methylnaphthalene, for example methylnaphthalene may be present in an amount of 1 ppm or less, or 0.5 ppm or less, or 0.1 ppm or less, or 0 to 1 ppm based upon the total weight of the composition, or may be present in an minor amount considered to be an impurity.

In some embodiments in which the aromatic organic solvent composition according to an embodiment is essentially free of or free of methylnaphthalene, the pour point of the aromatic organic solvent composition may be further reduced.

In some embodiments, the aromatic organic solvent composition may have a mixed aniline point of 10° C. to 30° C., or 10° C. to 25° C., or 10° C. to 20° C. That is, the aromatic organic solvent composition according to an embodiment has excellent solubility and/or compatibility.

In some embodiments, the aromatic organic solvent composition may have a dry point of 180° C. to 200° C., or 185° C. to 195° C., and may have an excellent evaporation rate compared to existing heavy aromatic organic solvents.

In some embodiments, the aromatic organic solvent composition may have an initial boiling point (IBP) of 170° C. to 185° C., or, 170° C. to 180° C.

In some embodiments, the aromatic organic solvent composition may have a final boiling point (FBP) of 190° C. to 210° C., or 195° C. to 205° C.

In some embodiments, the aromatic organic solvent composition according to an embodiment has an IBP and a FBP as described above, and thus may have an appropriate flash point.

In some embodiments, the aromatic organic solvent composition may have a flash point of 50° C. to 70° C. In some embodiments, the aromatic organic solvent composition has a flash point as described above, and thus may be classified as a second petroleum and applied to various industries. If the flash point is less than 21° C., the petroleum organic solvents may be classified as a first petroleum that is easily ignited because they are sensitive to small impacts, slight moisture, and fire, and are subject to restrictions on manufacturing, carry, transportation, storage, designated quantity, and the like, and are very likely to cause stability problems such as fire during use. However, if the flash point is 21° C. or more, or 21° C. to 70° C., as described above, the petroleum organic solvents may be classified as a second petroleum to ensure stability, and may be provided as solvents in various fields with fewer restrictions on manufacturing, carry, transportation, and/or storage.

In some embodiments, the aromatic organic solvent composition may have a specific gravity of 0.880 to 0.894, or 0.880 to 0.890.

In some embodiments, there is provided a paint composition comprising the aromatic organic solvent composition, and any one or two or more mixed resins selected from ester-based, urethane-based, urea-based, epoxy-based, acrylic-based resins, and/or the like.

The organic solvent composition may be provided as a paint composition by directly blending with the resin, or may be provided as a paint composition by partially evaporating the aliphatic hydrocarbon-based mixture in the aromatic organic solvent composition and then blending with the resin, but the present invention is not limited thereto.

The resin may be any one or two or more mixed resins selected from a polyester resin, a polyurethane resin, a polyurea resin, an epoxy resin, an acrylic resin, and/or the like, and for example may be a resin comprising specific repeating units of two or more of the above-mentioned resins such as modified resins of these resins, for example, a polyurethane-urea resin, an epoxy-modified urethane resin, and an epoxy-modified acrylic resin.

In some embodiments, the paint composition may comprise 20 to 40% by weight, or 20 to 35% by weight, of the aromatic organic solvent composition with respect to the total weight, but the present invention is not limited thereto.

An aromatic organic solvent composition having reduced naphthalene content according to an embodiment may be applied to various industries such as paints, inks, detergents, adhesives, electronic materials, and/or solvents for agricultural chemicals.

Hereinafter, the embodiment described above will be described in more detail through Examples. However, the following Examples are for illustrative purposes only and do not limit the scope of rights.

<Measurement Method of Physical Properties>

1. Say Bolt Color

It was measured according to ASTMD 1209.

2. Specific Gravity (15.56/15.56° C.)

It was measured according to ASTM D4052.

3. Pour Point

It was measured according to ASTM D97.

4. Mixed Aniline Point

It was measured according to ASTM D611.

5. Flash Point

It was measured according to ASTMD 56.

6. Distillation Range (IBP-FBP)

The range from an initial boiling point (IBP) to a final boiling point (FBP) was measured according to ASTM D86.

7. Dry Point

It was measured according to ASTM D850.

Examples 1 to 4

The aromatic organic solvent compositions were prepared by mixing C9-C10 aromatic hydrocarbon compounds in amounts corresponding to Examples 1 to 4 of Table 1 below.

TABLE 1

| | | Example 1 | Example 2 | Example 3 | Example 4 |
|---|---|---|---|---|---|
| C9 (wt %) | 1,2,4-Trimethylbenzene | 9.5 | 9.4 | 9.8 | 9.1 |
| | 1,2,3-Trimethylbenzene | 16.9 | 21.2 | 23.4 | 18.5 |
| | Others | Balance | Balance | Balance | Balance |
| | Total | 29.4 | 33.2 | 35.7 | 35.8 |

TABLE 1-continued

| | | Example 1 | Example 2 | Example 3 | Example 4 |
|---|---|---|---|---|---|
| C10 (wt %) | 1,4-Dimethyl-2-ethylbenzene | 5.6 | 5.2 | 5.3 | 4.7 |
| | 1,3-Dimethyl-4-ethylbenzene | 5.7 | 5.3 | 5.7 | 4.8 |
| | 1,3-Dimethyl-5-ethylbenzene | 5.8 | 5.2 | 5.8 | 4.8 |
| | 1,2-Dimethyl-4-ethylbenzene | 24.8 | 23.7 | 25.4 | 12.1 |
| | 1,2-Dimethyl-3-ethylbenzene | 2.8 | 2.5 | 2.4 | 2.1 |
| | 1-Methyl-3-n-propylbenzene | 9.5 | 8.9 | 2.5 | 5.1 |
| | 1,2,4,5-Tetramethylbenzene | 5.9 | 6.3 | 6.5 | 6.9 |
| | 1,2,3,5-Tetramethylbenzene | 1.8 | 3.3 | 5.7 | 8.5 |
| | Naphthalene | 0.0004 | 0.0003 | 0.0004 | 0.0005 |
| | Others | Balance | Balance | Balance | Balance |
| | Total | 70.6 | 66.8 | 64.3 | 64.2 |
| Total (wt %) | | 100 | 100 | 100 | 100 |

Comparative Examples 1 and 5

The aromatic organic solvent compositions were prepared by mixing C9-C10 aromatic hydrocarbon compounds in amounts corresponding to Comparative Examples 1 to 5 of Table 2 below.

TABLE 2

| | | Comp. Example 1 | Comp. Example 2 | Comp. Example3 | Comp. Example4 | Comp. Example 5 |
|---|---|---|---|---|---|---|
| C9 (wt %) | 1,2,4-Trimethylbenzene | 12.8 | 5.1 | 5.1 | 4.9 | 13.8 |
| | 1,2,3-Trimethylbenzene | 31.5 | 15.8 | 16.7 | 17.2 | 18.5 |
| | Others | Balance | Balance | Balance | Balance | Balance |
| | Total | 45.4 | 24.9 | 29.5 | 35.8 | 33.1 |
| C10 (wt %) | 1,4-Dimethyl-2-ethylbenzene | 4.8 | 7.5 | 6.7 | 6.2 | 7.7 |
| | 1,3-Dimethyl-4-ethylbenzene | 4.9 | 7.3 | 6.8 | 6.2 | 7.8 |
| | 1,3-Dimethyl-5-ethylbenzene | 4.9 | 7.5 | 6.8 | 6.3 | 7.8 |
| | 1,2-Dimethyl-4-ethylbenzene | 6 | 6.2 | 8.5 | 7.9 | 8 |
| | 1,2-Dimethyl-3-ethylbenzene | 7.2 | 8.1 | 10.8 | 8.1 | 9.2 |
| | 1-Methyl-3-n-propylbenzene | 3.8 | 5.8 | 5.9 | 2.9 | 5.2 |
| | 1,2,4,5-Tetramethylbenzene | 14.8 | 16.8 | 17.2 | 18.1 | 17.5 |
| | 1,2,3,5-Tetramethylbenzene | 3.2 | 8.3 | 7.3 | 6.9 | 3.1 |
| | Naphthalene | 0.0005 | 0.0004 | 0.0005 | 0.005 | 0.025 |
| | Others | Balance | Balance | Balance | Balance | Balance |
| | Total | 54.6 | 75.1 | 70.5 | 64.2 | 66.9 |
| | Total (wt %) | 100 | 100 | 100 | 100 | 100 |

TABLE 3

| | C9:C10 (Weight ratio) | Trimethylbenzene:Tetramethylbenzene (Weight ratio) | Naphthalene (wt %) |
|---|---|---|---|
| Example 1 | 1:2.4 | 1:0.3 | 0.0004 |
| Example 2 | 1:2.0 | 1:0.3 | 0.0003 |
| Example 3 | 1:1.8 | 1.0.4 | 0.0004 |

TABLE 3-continued

| | C9:C10 (Weight ratio) | Trimethylbenzene:Tetramethylbenzene (Weight ratio) | Naphthalene (wt %) |
|---|---|---|---|
| Example 4 | 1:1.8 | 1:0.6 | 0.0005 |
| Comp. Example 1 | 1:1.2 | 1:0.4 | 0.0005 |

TABLE 3-continued

| | C9:C10 (Weight ratio) | Trimethylbenzene:Tetramethylbenzene (Weight ratio) | Naphthalene (wt %) |
|---|---|---|---|
| Comp. Example 2 | 1:3.0 | 1:1.2 | 0.0004 |
| Comp. Example 3 | 1:2.4 | 1:1.1 | 0.0005 |
| Comp. Example 4 | 1:1.8 | 1:1.1 | 0.005 |
| Comp. Example 5 | 1:2.0 | 1:0.6 | 0.025 |

Evaluation Examples

Evaluation 1. Physical Property Evaluation

The physical properties of the aromatic organic solvent compositions prepared in Examples and Comparative Examples were measured using the method described in <Measurement method of physical properties>, and the results are shown in Table 4 below.

TABLE 4

| | Pour point (° C.) | Color (Say bolt) | Specific gravity | Mixed aniline point (° C.) | Distillation range (° C.) | Flash point (° C.) |
|---|---|---|---|---|---|---|
| Example 1 | −90 | 30 | 0.886 | 14.6 | 177.6-199.9 | 60 |
| Example 2 | −84 | 30 | 0.884 | 14.4 | 176.1-200.3 | 59 |
| Example 3 | −82 | 30 | 0.881 | 14.1 | 174.2-197.6 | 56 |
| Example 4 | −72 | 30 | 0.881 | 14.0 | 174.3-199.5 | 57 |
| Comp. Example 1 | −25 | 30 | 0.872 | 13.7 | 161.4-183.1 | 54 |
| Comp. Example 2 | −20 | 30 | 0.890 | 15.1 | 181.3-208.5 | 61 |
| Comp. Example 3 | −18 | 30 | 0.886 | 14.5 | 177.5-202.2 | 60 |
| Comp. Example 4 | −15 | 30 | 0.881 | 14.1 | 174.0-197.7 | 56 |
| Comp. Example 5 | −16 | 30 | 0.884 | 14.3 | 175.9-199.8 | 57 |

Evaluation 2. Evaluation of Whether or not Precipitates were Generated

The aromatic organic solvent compositions prepared in the Examples and Comparative Examples were each put in an individual polyethylene bottle, stored at −35° C. to observe whether or not precipitates were generated, and the results are shown in Table 5 below (1A: precipitation occurs after 1 week of storage, 2A: precipitation occurs after 2 weeks of storage, 3A: precipitation occurs after 3 weeks of storage, 4A: precipitation occurs after 4 weeks of storage, –: no precipitation occurs).

TABLE 5

| | Examples | | | | Comp. Examples | | | | |
|---|---|---|---|---|---|---|---|---|---|
| | 1 | 2 | 3 | 4 | 1 | 2 | 3 | 4 | 5 |
| Whether or not precipitates were generated | — | — | — | — | 4A | 3A | 2A | 1A | 1A |

As shown in Table 4, it was found that the aromatic organic solvent compositions of Examples 1-4 each had a remarkably excellent pour point. The aromatic organic solvent compositions of Examples 1-4 effectively suppressed the solid precipitation phenomenon at a low temperature as evidenced by whether or not precipitates were generated (Table 5). In the case of the aromatic organic solvent compositions of Examples 1 to 4, the precipitation phenomenon did not occur even after observation for 8 weeks, whereas in the case of the compositions of Comparative Examples 1 to 5, precipitation phenomenon occurred due to low stability. This suggests that the aromatic organic solvent compositions according to Examples 1-4 can suppress the generation of precipitates in a storage container during long-term low-temperature storage, and can effectively suppress clogging of pipes when flowing in pipes.

The aromatic organic solvent composition according to an embodiment can effectively suppress the precipitation of solids in a low-temperature environment of −30° C. or less, which was a problem of existing heavy aromatic organic solvent compositions. Accordingly, even if the aromatic organic solvent composition is stored for a long time in an extremely low-temperature environment, it can effectively suppress the generation of precipitates, and clogging and corrosion of pipes during flow.

In addition, the content of naphthalene, which is classified as a specific water quality hazardous substance and a class 2B carcinogen, is significantly reduced, so the safety to the human body and the environment is very excellent.

Further, the aromatic organic solvent composition according to an embodiment may have a mixed aniline point of a certain level or less (e.g., 15° C. or less), thereby having excellent solubility for resins, and/or may have a flash point of a certain level or more (e.g., 55° C. or more), thereby ensuring stability in the manufacturing process.

Accordingly, the aromatic organic solvent composition according to an embodiment has excellent compatibility and can be applied to paints, detergents, electronic material compositions, etc.

Hereinabove, although the present invention has been described by specific matters and the limited embodiments, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. An aromatic organic solvent composition in which a weight ratio of C9 aromatic hydrocarbon to C10 aromatic hydrocarbon is 1:1.5 to 1:2.8, a weight ratio of trimethylbenzene to tetramethylbenzene is 1:0.1 to 1:1, the content of naphthalene is ppm or less, and a pour point is −90° C. to −30° C.

2. The aromatic organic solvent composition of claim 1, wherein the aromatic organic solvent composition comprises 27 to 40% by weight of C9 aromatic hydrocarbon and 60 to 75% by weight of C10 aromatic hydrocarbon.

3. The aromatic organic solvent composition of claim 1, wherein a weight ratio of dimethylethylbenzene to tetramethylbenzene in the aromatic organic solvent composition is 1:0.05 to 1:0.5.

4. The aromatic organic solvent composition of claim 1, wherein the aromatic organic solvent composition comprises 1 ppm or less of methylnaphthalene in the total weight of the composition.

5. The aromatic organic solvent composition of claim 1, wherein the aromatic organic solvent composition has a mixed aniline point of 10° C. to 30° C.

6. The aromatic organic solvent composition of claim 1, wherein the aromatic organic solvent composition has a dry point of 180° C. to 200° C.

7. The aromatic organic solvent composition of claim 1, wherein the aromatic organic solvent composition has an initial boiling point (IBP) of 170° C. to 185° C.

8. The aromatic organic solvent composition of claim 1, wherein the aromatic organic solvent composition has a final boiling point (FBP) of 190° C. to 210° C.

9. The aromatic organic solvent composition of claim 1, wherein the aromatic organic solvent composition has a specific gravity of to 0.895.

10. A paint composition comprising the aromatic organic solvent composition of claim 1, and any one or two or more mixed resins selected from ester-based, urethane-based, urea-based, epoxy-based, and/or acrylic-based resins.

11. The paint composition of claim 10, wherein the paint composition comprises 20 to 40% by weight of the aromatic organic solvent composition with respect to the total weight of the paint composition.

* * * * *